Patented Nov. 14, 1944

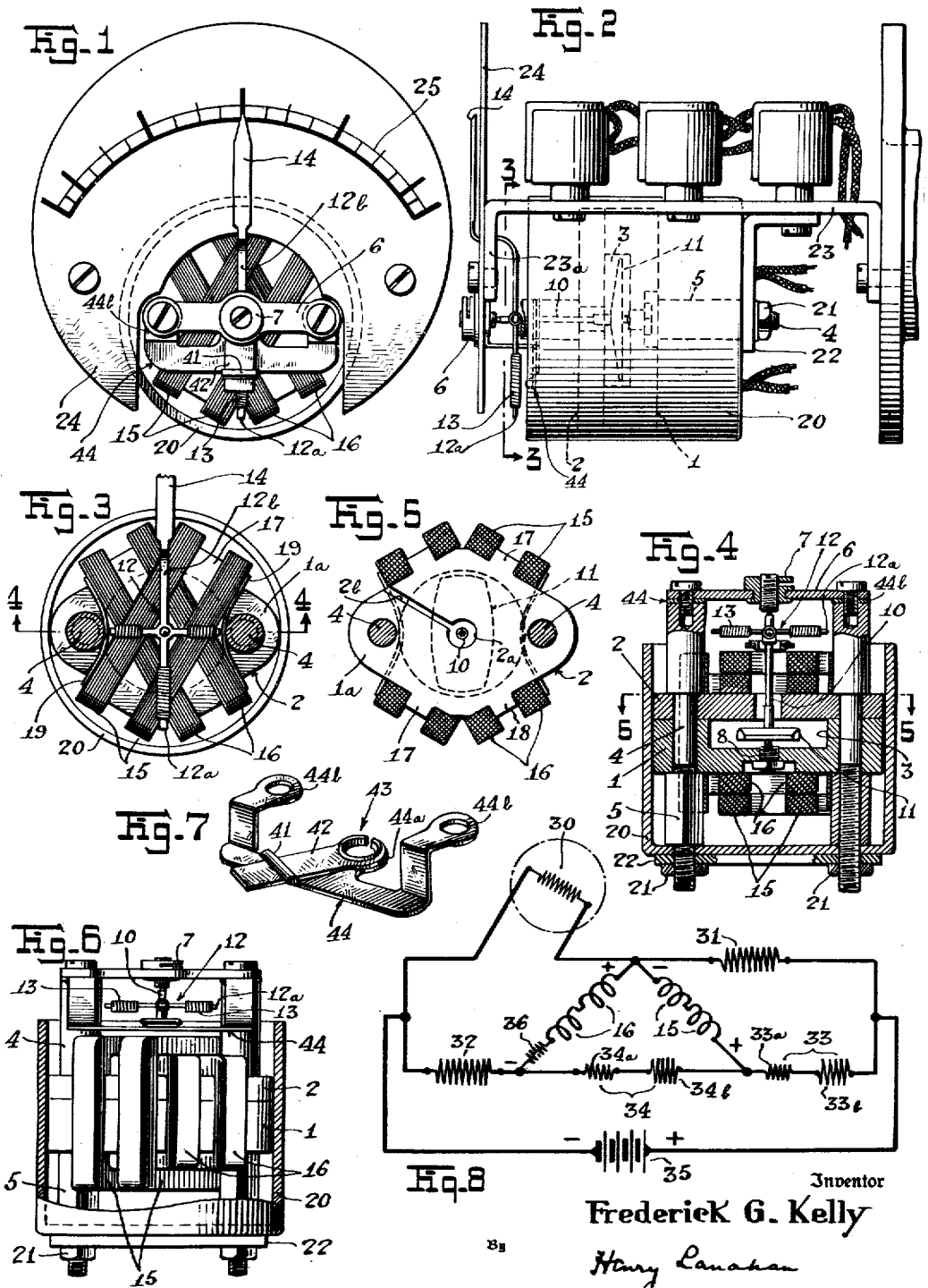

2,362,562

UNITED STATES PATENT OFFICE 2,362,562

METER SYSTEM

Frederick G. Kelly, West Orange, N. J., assignor to Thomas A. Edison, Incorporated, West Orange, N. J., a corporation of New Jersey Application July 8, 1942, Serial No. 450,222

13 Claims. (Cl. 171—95)

This invention relates to meter systems, and more particularly to systems for the measurement of electrical quantities. My invention especially, though not in all aspects limitatively, contemplates the measurement of the unknown quantity by a comparison of the amplitudes of two electrical currents at least one of which is influenced by that quantity. The advantage, itself well known, of a measurement by current-amplitude comparison between two currents is that, so long as the same source is used for producing both currents, the comparison may be kept free of influence by variation in the voltage of the current source.

By way of specific example, and without intending unexpressed limitations, I have illustrated and most particularly described the invention as arranged for the measurement of a temperature-variable electrical resistance. In such a case that resistance may be exposed to an environment whose temperature is to be indicated, and the calibration of the meter system may be in terms of that temperature.

It is an object of my invention to provide an improved meter system for the measurement of an electrical quantity, and improvements in such systems.

It is an object of my invention to provide an improved such system which involves the comparison of the amplitudes of two electrical currents.

It is an object to provide an improved meter construction, and particularly an improved construction of a ratiometer adapted for use in such a system as last described.

Such systems commonly comprise a bridge circuit in which the ratiometer is comprised and into which there is connected the resistance or other element whose characteristic is to be measured. It is an object of my invention to provide an improved bridge circuit for such systems. It is another object to provide an improved combination of bridge circuit with ratiometer therein. Other objects are to provide a bridge circuit peculiarly adapted to an improved ratiometer, and to provide the improved ratiometer especially adapted to such a bridge circuit.

Among the more specific objects are to provide improved constructions of damping box, magnet and combinations of coils with damping box and with magnet; to provide an improved drift-torque arrangement; and to provide a generally simplified ratiometer construction.

Other objects are to improve the efficiency of a ratiometer, to improve the efficiency of the bridge adapted for use therewith, and to maintain the system free of the influence of temperature of the bridge and ratiometer components.

Other and allied objects will more fully appear from the following description and the appended claims.

In the description of my invention hereinafter set forth reference is had to the accompanying drawing, in which:

Figure 1 is a front elevational view of a ratiometer according to my invention;

Figure 2 is a side elevational view of the same ratiometer, together with certain associated elements of the meter system;

Figure 3 is a vertical cross-sectional view taken along the line 3—3 of Figure 2;

Figure 4 is a horizontal cross-sectional view taken substantially along the line 4—4 of Figure 3;

Figure 5 is a vertical cross-sectional view taken along the line 5—5 of Figure 4;

Figure 6 is a bottom plan view of the ratiometer, with a section of the external shield removed;

Figure 7 is a detail perspective view of the drift-torque magnet and the strap on which it is mounted; and Figure 8 is a schematic diagram of a meter system in which the ratiometer of earlier figures is incorporated.

It will be understood that the references to the arrangement of the ratiometer, as between vertical and horizontal (made to an orientation of the instrument which brings its scale vertical) are arbitrary and made only because that orientation is a common one—the moving system of the instrument being suitably balanced to provide for proper operation in any orientation.

Reference being had to Figures 1 through 6, the illustrated ratiometer may be seen to be assembled about a damping box as its base-forming element. This damping box comprises a shallow cup-shaped member 1 and a cover member 2, both relatively thick and of highly conductive material such as copper. These two members are held together by studs 4 passing therethrough and internally threaded bushings 5 tightened on the studs behind the member 1—the passage of the studs through this member occurring in the particularly wide side-wall regions 1a on each side of the cylindrical space 3 enclosed by the damping box. At the forward ends of the studs 4 there is secured thereto and extends between them a cross-member 6, in the center of which there is provided a front bearing 7. In the center of the damping-box member 1 there is provided a rear bearing 8. Between these bearings, and passing through a suitable oversized aperture 2a in the center of the damping-box cover member 2, there is journalled the moving system of the instrument.

This moving system comprises a spindle 10 on which there is secured, in a plane transverse of the spindle and within the space 3 enclosed by the damping box, a magnet 11 symmetrical about the spindle and extending therefrom to have its extremities closely adjacent the sidewalls of the space 3. The magnet 11 is preferably formed of one of the highly efficient magnet materials currently available, such as that commercially known as "Alnico." I have found it desirable that the magnet be slightly tapered in width, and substantially tapered in thickness, from its central to its extreme portions. On the spindle 10 externally of the damping box, and for example slightly behind the front bearing 7, there may be secured the usual four-arm "cross" 12, of which three arms 12a may carry respective small longitudinally adjustable balancing weights 13—and of which the fourth arm 12b is extended, and curved first forwardly and then upwardly, to form the needle 14 of the instrument.

The damping-box cover member 2, already mentioned as being provided with the central aperture 2a to pass the spindle 10, is also provided with a narrow cut-through slot 2b extending from the aperture 2a to the periphery of the member, so that as the member 2 is slipped sidewardly into place in front of the member 1 the spindle 10 (meanwhile manually held in engagement with the bearing 8) may come into the aperture 2a. It is of course after this operation that the studs 4 and cross-member 6 and bearing 7 are assembled in place, to complete the journalling of the moving system.

While the structure as so far described is available for use in various types of meters, much of the particular arrangement of further elements which I have illustrated is especially adapted for a ratiometer. Thus around the damping box, and in planes which extend from front to back of the instrument but are inclined from vertical (as illustrated, by 30 degrees to the left), there are supported by the damping box a pair of coils 16. These coils may closely fit the box, and may be positioned quite close to the spindle on the respective sides thereof. Accurately to establish the positions of these coils there may be provided on the damping box (e. g., on both the members 1 and 2) rectangular projections 18, centered on a plane containing the axis of the spindle, and having faces forming abutments for the coils. One of the coils 16 may be pushed rightwardly from the left side of the damping box into tight contact with the lefthand faces of the projections 18, while the other of these coils may be pushed leftwardly from the right side of the damping box into tight contact with the righthand faces of these projections. Around the damping box and coils 16, and in planes which extend from front to back of the instrument but are inclined from vertical oppositely to the inclination of the planes of coils 16 (as illustrated, by 30 degree to the right), there are supported by the damping box a pair of coils 15. Accurately to establish the positions of these coils there may be provided on the damping box rectangular projections 17; these are similar in function and position to the projections 18 above described, excepting that they function for coils 15 and that they are on opposite sides of the central plane of the instrument from projections 18.

It will of course be understood that the assembly of the coils 16 and 15 into at least approximate position is effected before the final assembly of the studs 4 and cross-member 6 and bearing 7. After that final assembly the coils may be brought into final position against the abutments, and secured in place either by cementing to the damping box, or by somewhat resilient insulating pieces 19 stressed around the respectively adjacent studs to press against the outer coil surfaces, or by both these expedients.

To protect the magnet 11 of the instrument from the spurious influences of stray fields there is assembled around the damping box and coils a shield 20 of high-permeability and low-hysteresis material. This shield may be in the form of a cup, open at the front and slipped onto the assembly from the rear a little more than enough to fully surround the coils; the bushings 5 abovementioned may be of suitable length to be impinged against by the end of the shield 20 when the latter is in the desired position, the extreme threaded portions of the studs 4 then penetrating through the end of the shield and externally accommodating nuts 21 serving to clamp the shield in place. If desired, and as illustrated, there may be clamped between nuts 21 and the shield 20 the vertical portion of a bracket 22 by which the entire ratiometer proper may be supported.

The bracket 22 may hang down from a pair of horizontal narrow plates 23 (between and slightly above which the top portion of the shield 20 may project), which plates forwardly may extend to approximately the plane of the cross-member 6; there they may be bent downwardly to form lugs 23a against which a disc 24 carrying a scale 25 for the instrument may be screwed. The lower central portion of the scale disc 24 may be cut away, to expose practically the full front elevational extent of the ratiometer proper and to permit the forwardly curved portion of the arm 12b to reach a plane in front of the scale before that arm is curved upwardly to form the needle 14.

The instrument so particularly described is especially adapted for the measurement of the ratio between two currents respectively passed through the two pairs of coils 15 and 16. The magnet 11 will align itself, both as to inclination of its magnetic axis (e. g., its longitudinal center line) and as to direction along that inclination, with the inclination and direction along and in which the net field resulting from the two pairs of coiled is strongest. If current traverses only the pair of coils 15, the net field is the field of that pair of coils and is strongest along a line inclined 60 degrees to the left from vertical; the magnet 11 will be inclined along such a line; the needle 14 (assuming the illustrated alignment of needle with magnet axis) will be similarly inclined; and, assuming the current flow to be in the appropriate one of the two possible directions, the direction of magnet and needle alignment along the 60-degree inclination will be such as to bring the needle to the left extremity of such a scale as scale 25— i. e., one which extends 60 degrees to the left and to the right from vertical. On the other hand if current traverses only the pair of coils 16, the net field is the field of this pair of coils and is strongest along a line inclined 60 degrees to the right from vertical; the magnet 11 will be inclined along such a line; the needle 14 will be similarly inclined; and, assuming the current flow to be in the appropriate one of the two possible directions, the direction of magnet and needle alignment will be such as to bring the needle to the right extremity of scale 25. With two currents simultaneously traversing the respecttive pairs of coils (each in the respective appropriate direction abovementioned) the net field is strongest along a line having an inclination which lies within the range of plus-and-minus 60 degrees from vertical and whose exact value is dependent on the ratio of the currents; the magnet 11 will be inclined along such a line; and the needle 14, similarly inclined, will point to an intermediate spot on scale 25 whose calibration will be a precise indication of the ratito of the two currents respectively traversing the pairs of coils.

The structure which I have illustrated and described above is a very efficient one in the performance of the function just outlined. The sensitivity of magnet and needle to the current conditions to be measured is a function, among other things, of the ratio between the torque developed by the moving system in response to a unit field stimulus, and the mass of the moving system; this ratio is maintained at an especially high value by the illustrated and described structure of the moving system, and particularly of the magnet itself. The sensitivity is further a function of the field stimulus, actually effective on the magnet, per unit coil current; this is kept high by the arrangement of the magnet relative to the coils—the coupling between them being unusually close for a well damped instrument. Not only is this coupling close as a generality, but it is maintained quite uniformly close throughout the very substantial length (e. g., 120 degrees) of scale. This relative uniformity of close coupling is particularly contributed to in this instrument by the distribution of the horizontal legs of the coils (which legs the magnet poles most closely approach) about the axis of the instrument, and by the relationship between this distribution and the magnet poles. Thus it may be seen (best from Figure 5) that, both around the top and around the bottom of the instrument, between approximately 56 degrees to the left and 56 degrees to the right of vertical there are only three breaks in the continuity of the peripheral spread of the horizontal coil legs—and these breaks are respectively only of the order of 18 degrees, 4 degrees and 18 degrees. Each magnet pole subtends an angle about the axis of approximately 45 degrees. From these relationships it may be shown that at any position within the 120-degree scale at least 18 degrees out of the 45 degrees—or approximately ⅖ths—of the magnet pole is radially aligned with horizontal-coil-leg portions, this being individually true for both poles of the magnet.

The foregoing characteristics are achieved with sacrifice of damping action, which is very efficiently preserved in this structure. This action is effected, upon any movement of the magnet, by the eddy currents which that movement induces in the damping box. The substantial continuity of enclosure of the magnet by the box, not only around but also in front of and behind the magnet, and the construction of the box with a thickness at least of the order of, and (as illustrated and preferred) preferably substantially greater than, the thickness of the bar magnet which it encloses, as well as the close spacing of the box from the magnet, are features prominently contributing to the effectiveness of the damping action.

A meter system of which the ratiometer described above may form a part, and for which it is especially suited, is shown in Figure 8. By way of example, this system has been shown as one adapted for the measurement of the electrical resistance of a temperature-variable resistance element 30—for example, a resistance-thermometer bulb of the type disclosed and claimed in my co-pending application Serial No. 346,892, filed July 23, 1940, now issued as Patent No. 2,307,626, which type of bulb may be and normally is disposed remotely from the rest of the system. The measurement of the resistance of the bulb of other element 30 serves as a measurement of the temperature of that element and hence of the ambient in which it is immersed; and the scale 25 of the ratiometer may be calibrated, for example, in terms of that temperature.

In Figure 8 it will be seen that the variable resistance element 30 and a resistance element 31 are connected in series with each other across a battery or other source of current 35; while also across the battery, and in series with each other, there are connected a resistance 32 and a resistance 33. Since a circuit or cross-arm is to be connected from between 32 and 33 to between 30 and 31, the arrangement is obviously a bridge—of which each of the four elements 30, 31, 32, 33 may be termed a leg, and of which 30—31 may be termed one branch and 32—33 another branch. Physically, the resistances of the bridge may be conveniently positioned on the narrow plates 23 abovementioned, as has been indicated in the side elevational Figure 2.

According to my invention the cross-arm of the bridge is formed as a triangle or "delta," of which the two pairs of coils 15 and 16 respectively constitute the two sides, and a fixed resistance 34 constitutes the base—the base being serially interposed between the two legs of one branch (preferably 32—33) of the bridge, and the apex (or junction between the two pairs of coils) being connected to the junction between the two legs of the other branch (preferably 31—32) of the bridge.

The bridge may be considered "balanced" when the resistance of element 30 is such as to cause the potential of the apex of the delta (e. g., the junction between 30 and 31) to coincide with a potential midway between the potentials of the extremities of the base (e. g., of the extremities of resistance 34). Under this balanced condition the cross-current in the bridge, if considered as the algebraic sum of the two currents respectively traversing the two pairs of coils, would be zero—in that the two currents are equal in magnitude, but flow in opposite directions as between the two branches of the bridge. In connecting the two pairs of coils, however, I so polarize them that each of the two current directions just mentioned constitutes for its pair of coils the appropriate direction for the ratiometer action above outlined. The currents in the two pairs of coils being equal in the balanced condition, the ratiometer then yields an intermediate reading (which would be a precisely midscale reading excepting for the slightly altering influence of an effect hereinafter mentioned).

As the resistance of the element 30 varies from that value which causes the bridge to be balanced, the current traversing one pair of coils will increase and that traversing the other pair will decrease (their algebraic sum increasing positively or negatively from zero, while their arithmetic sum remains substantially identical with the value it had in the balanced condition).

This obviously alters the ratio between the two currents; and the ratiometer needle 14 will swing leftwardly or rightwardly from the abovementioned intermediate reading, according to whether the resistance 30 has decreased or increased in value. Upon a sufficient change of the resistance of element 30 the current in one of the pairs of coils (16 if the change is a resistance reduction, 15 if a resistance increase) will be reduced to zero, while that in the other pair will have increased to substantially twice its balanced-condition value; under this condition the needle 14 will point to an extremity of the scale 25.

It is to be understood that upon a still greater variation of the resistance of element 30 beyond the condition last mentioned, although that one of the two coil currents which was zero in that condition now becomes negative (i. e., flows in opposite direction to normal), the action of the system will continue smoothly, the needle progressing to off-scale readings. That this should occur may be best understood from the observation that the action of the system may be resolved into the production of a force tending to render the magnet vertical and proportional to the arithmetic sum of the two coil currents, and a force tending to render the magnet horizontal and proportional to the algebraic sum of the two currents; the first sum is essentially constant, while the second obviously varies smoothly with variation of the resistance of element 30. The reason for ultimately terminating the scale 25 (e. g., at 60 degrees from vertical) lies in the scale-extremity crowding which would occur in steeply increasing degree if the scale were made appreciably longer.

The coils 16, being in their inclined legs closer to the magnet, are slightly more effective than the coils 15, for any given current value presupposing an identical number of turns for the different coils. However, the relative effectiveness of the coils may be altered to any desired extent, or eliminated, by suitable differentiation of the numbers of turns in the coils of the respective pairs. Frequently however—as is the case with a typical resistance-thermometer bulb when employed for the element 30—there is some deviation of the variation of element 30 from a linear relationship to the quantity (e. g., temperature) in terms of which the scale 25 is calibrated, tending to result in a compacting of one side of the scale (typically with the resistance-thermometer bulb, of the lowtemperature or lefthand side) and expansion of to the other, accompanied by a shifting of what should be the central point of the scale. When one pair of coils is more effective than the other, there results a generally similar compacting of the side of the scale to which the axis of those coils inclines (for coils 16, a compacting of the righthand side of the scale) and expansion of the other; and this effect may be used to offset or approximately neutralize the abovementioned compacting effect due to the element 30. Accordingly in a typical case I have preferred to employ a similar number of turns for both the coils 16 and 15, in spite of the slightly more effective positioning of the former.

In the foregoing discussion of the action of the system it has been assumed that the resistances of the two pairs of coils were identical. Whether or not the number of turns is similar for the two pairs, nevertheless the difference in average turn-length between the pairs tends to differentiate their resistances. While theoretically the net resistance-differentiating tendency might be neutralized by careful differentiation of the sizes of wire employed for the coils of the respective pairs, it is usually more desirable to employ an identical wire size for all coils, and to introduce a resistance (e. g., 36, Figure 8) in series with the pair of coils of lower resistance, to render the total resistance of each side of the delta identical.

It is highly desirable that the system be free of influence by the temperature of the ambient to which its elements (other, of course, than the element 30) are exposed. It is of course possible to employ for the resistance elements wire of negligible temperature coefficient, such as that commercially available under the trade-name "Manganin," and this is preferably done for elements 31 and 32 and at least the major portion of 33. There remains, however, the coils 15 and 16 themselves, which are of course preferably wound with copper wire, whose temperature coefficient is substantial (and preferably the small resistance 36 for symmetry of the delta, is of copper). I have found that it is possible to make the ratio of the currents in the two pairs of coils almost utterly independent of temperature by the primary expedient of forming the resistance 34 (a relatively small resistance) partly of copper wire (section 34a, Figure 8) and partly of the negligible-coefficient wire (section 34b)—preferably coupled with the secondary expedient of forming a very small portion of the resistance 33 (section 33a) of copper wire.

I may mention that with a resistance-thermometer bulb (element 30) whose resistance varies from 108 ohms at 50 degrees to 129 ohms at 100 degrees to 152 ohms at 150 degrees, and with coils (and resistance 36) such that the resistance of each side of the delta is approximately 320 ohms, I have satisfactorily employed resistances of the following approximate values: 31, 700 ohms Manganin; 32, 121 ohms Manganin; 33a, 21 ohms copper; 33b, 679 ohms manganin; 34a, 9.3 ohms copper; and 34b, 6.7 ohms Manganin.

In the system as thus far described there is no provision for establishing any particular angular position of the magnet and needle in the absence of energization of the bridge by the current source. Frequently, however, it is desirable that there be established a bias, to some predetermined position, which will be effective in the absence of that energization. This may be done by a small auxiliary, or "drift-torque", magnet positioned for slight, but sufficient, influence on the main magnet 11. Such an auxiliary magnet I have illustrated as 41. I have found that a particularly favorable manner of mounting this auxiliary magnet is to provide an arm (e. g., 42) angularly adjustable about the axis of pivoting of the main magnet, and to mount the auxiliary magnet on an outward portion of this arm. In order to permit easy access to this arm for adjustment, I prefer to pivot the arm (as at 43) to an upward central lug 44a formed from a strap 44, which extends horizontally in a vertical plane a little behind the plane of the cross-member 6 and just within the mouth of the shield. This strap may be formed with end lugs 44b extending first forwardly and then upwardly to be clamped to the front of the studs 4 immediately behind the cross-member 6.

It will be understood that the arm 42 may be angularly adjusted so that the auxiliary magnet 41 biases the main magnet 11 to any desired angular position. It is of course true that the constant bias exerted by the auxiliary magnet will be effective during periods of energization of the bridge (i. e., periods of use) as well as in the absence of such energization. For any particular position of the auxiliary magnet, however, the effect of its constant bias during periods of energization may be compensated for to keep the meter indications accurate, by a suitable adjustment of the bridge resistances. Specifically, the horizontal component of this constant bias may be compensated for by an appropriate slight unbalance of the bridge (i. e., slight revision of the value of any one of the fixed resistances 31, 32 and 33), while the vertical component of this constant bias may be compensated for by an appropriate slight alteration of the value of resistance 34.

While the foregoing description has been presented especially as to a meter system of the ratiometer type, and with particular reference to a specific such system, it will be appreciated that many of the aspects of my invention are applicable to and useful in meter systems generally, and I therefore do not intend unexpressed limitations. The scope of my invention I undertake to set forth in the appended claims.

I claim:

1. In a meter of the type comprising a magnet and a spindle on which said magnet is mounted for rotation, and coil means for creating a magnetic field effective on said magnet: a damping box of material of high conductivity within which said magnet is rotatable, said box comprising base and cover members, said base member being provided with a bearing for said spindle, and said cover member being provided with a spindle-passing aperture and a cut-through slot from said aperture to the periphery of said cover member.

2. In a ratiometer of the type comprising a magnet pivoted for rotation in response to a plurality of superimposed magnetic fields, and a plurality of coils for producing said fields: a damping box within which said magnet is rotatable and around which said coils are positioned, said box being formed with a plurality of external abutments against which said coils may be pushed and which form localizing means for said coils.

3. In a ratiometer of the type comprising a magnet pivoted for rotation in response to a plurality of superimposed magnetic fields: the combination of a damping box forming a relatively close enclosure about said magnet and externally provided with a plurality of abutments; and a plurality of coils for producing said fields, surrounding said box and positioned against and localized by said abutments.

4. In a meter system comprising a ratiometer having two coils at angles to each other, and an electrical bridge having two branches adapted for connection across a current source: a crossarm for said bridge in the form of an electrical delta, the base of said delta comprising a resistance serially interposed in one of said branches, the sides of said delta respectively comprising said coils, and the apex of said delta being connected to a point in the other of said branches.

5. In a meter system including a ratiometer: the combination of a resistance to be measured and three fixed resistances electrically arranged in the form of a bridge consisting of two branches adapted for connection across a current source; an added resistance serially interposed in a first of said branches; and two coils comprised in said ratiometer and connected from a common point in the second of said bridge branches to the respective extremities of said added resistance.

6. The combination according to claim 5, wherein said fixed resistances are of lower temperature coefficient of resistance than that of said coils, and wherein said added resistance is of a temperature coefficient intermediate between those of said fixed resistances and of said coils.

7. In a meter system including a ratiometer having a magnetic element pivoted for rotation in response to changes in the relative strength of two superimposed magnetic fields, and an electrical bridge consisting of two branches adapted for connection across a current source, one of said branches comprising two fixed resistances and the other of said branches comprising one fixed resistance and a resistance which is variable as a non-linear function of a condition to be measured: the combination of an added fixed resistance serially interposed between the resistances of said one branch; a pair of coils for producing said magnetic fields, said coils being connected from a common point in said other branch to the respective extremities of said added resistance, and the effective spacing of one of said coils with respect to said pivoted magnetic element being different than that of the other of said coils whereby said coils will have different effectiveness on said pivoted magnetic element to offset at least partially the non-linearity of variation of said variable resistance.

8. In a meter system including a ratiometer having a magnet pivoted for rotation in response to changes in the relative strengths of two superimposed magnetic fields, and an electrical bridge consisting of two branches adapted for connection across a current source, one of said branches comprising two fixed resistances and the other of said branches comprising a fixed resistance and a resistance which is variable as a non-linear function of a condition to be measured: the combination of an added resistance serially interposed between the said resistances of said one branch; a pair of coils for producing said magnetic fields, said coils being connected from a common point in said other branch to the respective extremities of said added resistance, and said coils being adapted to produce magnetic fields of different effectiveness on said magnet when the coils are current-energized to the same degree whereby to offset at least partially the non-linearity of variation of said variable resistance.

9. In a meter system comprising a ratiometer having a magnetic element pivoted for rotation in response to changes in the relative strength of a plurality of superimposed magnetic fields, a plurality of coils for producing said fields, and an electrical bridge having two branches adapted for connection across a current source: a cross arm for said bridge in the form of an electrical delta, the base of said delta comprising a resistance serially interposed in one of said branches, the sides of said delta respectively comprising said coils, and the apex of said delta being connected to a point in the other of said branches.

10. In a meter system comprising a ratiometer having a magnetic element pivoted for rotation in response to changes in the relative strength of two superimposed magnetic fields, and an electrical bridge having two branches adapted for connection across a current source: a cross arm for said bridge in the form of an electrical delta, the base of said delta comprising a resistance serially interposed in one of said branches, the apex of said delta being connected to a point in the other of said branches, the sides of said delta respectively comprising said coils, and a compensating resistance for said system serially interposed in one of the sides of said delta.

11. In a meter system including a ratiometer having a magnet pivoted to deflect in response to changes in the relative strength of two superimposed magnetic fields, and a pair of coils for producing said fields: the combination of a bridge circuit for directing current from a current source through said coils and for causing a current increase in one of said coils and a current decrease in the other of said coils in response to an increase through a predetermined range of variation in the value of a resistance to be measured, said bridge consisting of two branches of which one branch serially includes said variable resistance and a fixed resistance and the other branch serially includes three fixed resistances, said coils being connected from the junction point of the resistances of said one branch to the respective extremities of the middle resistance of said other branch, and a compensating resistance for said system connected between said branches of said bridge in series with said one coil.

12. In a ratiometer system including a pair of coils for producing superimposed magnetic fields: the combination of an electrical bridge for directing current from a voltage source through said coils and causing the currents in the coils to vary in opposite directions in response to a variation in the value of a resistance to be measured, said resistance being included in said bridge and said coils being connected between the branches of said bridge; a magnetic element pivoted to deflect in one direction and another from a mean position according to the relative effective values of the magnetic fields produced by said coils; and means to control the deflection characteristic of said pivoted magnet element in its range of deflection to one side of its said mean position without substantially affecting its deflection characteristic in its range to the other side of its mean position, said means comprising a resistance in said cross arm in series with one of said coils.

13. In a meter system including a ratiometer: the combination of a resistance to be measured and three fixed resistances electrically arranged in the form of a bridge consisting of two branches adapted for connection across a current source, said fixed resistances being each characterized as having a substantially negligible temperature coefficient; an added resistance serially interposed in the first of said branches; and two coils comprised in said ratiometer and connected from a common point in the second of said bridge branches to the respective extremities of said added resistance, the wire of said coils being of a material having a substantial temperature coefficient, and said added resistance comprising two components comparable in magniture and made respectively of said material and of a material having a substantially zero temperature coefficient.

FREDERICK G. KELLY.

CERTIFICATE OF CORRECTION.

Patent No. 2,362,562. November 14, 1944.

FREDERICK G. KELLY.

It is hereby certified that error appears in the printed specification of the above numbered patent requiring correction as follows: Page 2, first column, line 68, for "degree" read --degrees--; and second column, line 54, for "coiled" read --coils--; page 3, first column, line 4, for "respecttive" read --respective--; line 14, for "ratito" read --ratio--; line 60, for "with" read --without--; page 5, first column, line 13, for "31, 33" read --31, 32--; and that the said Letters Patent should be read with this correction therein that the same may conform to the record of the case in the Patent Office.

Signed and sealed this 18th day of December, A. D. 1945.

(Seal)

Leslie Frazer
First Assistant Commissioner of Patents.

the base of said delta comprising a resistance serially interposed in one of said branches, the apex of said delta being connected to a point in the other of said branches, the sides of said delta respectively comprising said coils, and a compensating resistance for said system serially interposed in one of the sides of said delta.

11. In a meter system including a ratiometer having a magnet pivoted to deflect in response to changes in the relative strength of two superimposed magnetic fields, and a pair of coils for producing said fields: the combination of a bridge circuit for directing current from a current source through said coils and for causing a current increase in one of said coils and a current decrease in the other of said coils in response to an increase through a predetermined range of variation in the value of a resistance to be measured, said bridge consisting of two branches of which one branch serially includes said variable resistance and a fixed resistance and the other branch serially includes three fixed resistances, said coils being connected from the junction point of the resistances of said one branch to the respective extremities of the middle resistance of said other branch, and a compensating resistance for said system connected between said branches of said bridge in series with said one coil.

12. In a ratiometer system including a pair of coils for producing superimposed magnetic fields: the combination of an electrical bridge for directing current from a voltage source through said coils and causing the currents in the coils to vary in opposite directions in response to a variation in the value of a resistance to be measured, said resistance being included in said bridge and said coils being connected between the branches of said bridge; a magnetic element pivoted to deflect in one direction and another from a mean position according to the relative effective values of the magnetic fields produced by said coils; and means to control the deflection characteristic of said pivoted magnet element in its range of deflection to one side of its said mean position without substantially affecting its deflection characteristic in its range to the other side of its mean position, said means comprising a resistance in said cross arm in series with one of said coils.

13. In a meter system including a ratiometer: the combination of a resistance to be measured and three fixed resistances electrically arranged in the form of a bridge consisting of two branches adapted for connection across a current source, said fixed resistances being each characterized as having a substantially negligible temperature coefficient; an added resistance serially interposed in the first of said branches; and two coils comprised in said ratiometer and connected from a common point in the second of said bridge branches to the respective extremities of said added resistance, the wire of said coils being of a material having a substantial temperature coefficient, and said added resistance comprising two components comparable in magniture and made respectively of said material and of a material having a substantially zero temperature coefficient.

FREDERICK G. KELLY.

---

CERTIFICATE OF CORRECTION.

Patent No. 2,362,562.　　　　　　　　　　　　　　November 14, 1944.

FREDERICK G. KELLY.

It is hereby certified that error appears in the printed specification of the above numbered patent requiring correction as follows: Page 2, first column, line 68, for "degree" read --degrees--; and second column, line 54, for "coiled" read --coils--; page 3, first column, line 4, for "respecttive" read --respective--; line 14, for "ratito" read --ratio--; line 60, for "with" read --without--; page 5, first column, line 13, for "31, 33" read --31, 32--; and that the said Letters Patent should be read with this correction therein that the same may conform to the record of the case in the Patent Office.

Signed and sealed this 18th day of December, A. D. 1945.

Leslie Frazer
(Seal)　　　　　　　　　　　　　　First Assistant Commissioner of Patents.